(12) United States Patent
von Tapavicza et al.

(10) Patent No.: US 6,344,431 B1
(45) Date of Patent: *Feb. 5, 2002

(54) USE OF SELECTED INHIBITORS AGAINST THE FORMATION OF SOLID ORGANO-BASED INCRUSTATIONS FROM FLUID HYDROCARBON MIXTURES

(76) Inventors: Stephan von Tapavicza, Thomas-Mann-Strasse 12, 4006 Erkrath; Wolfgang Zoellner, Ziegeleiweg 49, 4000 Duesseldorf 13; Claus-Peter Herold, Ostpreussenstrasse 26, 4020 Mettmann, all of (DE); Jacques Groffe, Pourra 04870, St. Michael L'Observatoire; Jean Rouet, 9, Rue des Ecoles, 37360 St. Antoine du Rocher, both of (FR)

( * ) Notice: Subject to any disclaimer, the term of this patent is extended or adjusted under 35 U.S.C. 154(b) by 0 days.

This patent is subject to a terminal disclaimer.

(21) Appl. No.: 08/256,199

(22) PCT Filed: Dec. 22, 1992

(86) PCT No.: PCT/EP92/02974

§ 371 Date: Sep. 1, 1994

§ 102(e) Date: Sep. 1, 1994

(87) PCT Pub. No.: WO93/13294

PCT Pub. Date: Jul. 8, 1994

(30) Foreign Application Priority Data

Dec. 30, 1991 (DE) .......................................... 41 43 056

(51) Int. Cl.[7] ................................................. C09K 7/00
(52) U.S. Cl. ........................................ 507/90; 507/128
(58) Field of Search ............................ 585/800; 507/90, 507/128, 129; 137/13; 208/48 R, 48 AA

(56) References Cited

U.S. PATENT DOCUMENTS

| | | | | |
|---|---|---|---|---|
| 2,873,253 A | * | 2/1959 | Stanphill | 507/90 |
| 2,927,078 A | * | 3/1960 | Nathan | 507/90 |
| 3,102,859 A | * | 9/1963 | Andersen et al. | 507/90 |
| 3,162,601 A | * | 12/1964 | Jones | 507/90 |
| 3,282,843 A | * | 11/1966 | Alburger | 252/52 R |
| 3,367,416 A | * | 2/1968 | Ralston et al. | 507/244 |
| 3,395,757 A | * | 8/1968 | Crossland et al. | 166/304 |
| 3,481,870 A | * | 12/1969 | Cheng et al. | 507/90 |
| 3,558,470 A | * | 1/1971 | Gillespie et al. | 208/48 AA |
| 3,645,886 A | * | 2/1972 | Gillespie et al. | 208/48 AA |
| 3,647,677 A | * | 3/1972 | Wolff et al. | 208/48 AA |
| 3,657,121 A | * | 4/1972 | Gannon et al. | 507/90 |
| 3,776,248 A | * | 12/1973 | Titus | 406/49 |
| 3,837,402 A | * | 9/1974 | Stringer | 166/303 |
| 4,005,020 A | * | 1/1977 | McCormick | 507/242 |
| 4,024,050 A | * | 5/1977 | Shell et al. | 208/48 AA |
| 4,152,289 A | * | 5/1979 | Griffin, Jr. | 252/315.1 |
| 4,226,700 A | * | 10/1980 | Broom | 208/48 AA |
| 4,425,223 A | * | 1/1984 | Miller | 208/48 AA |
| 4,444,649 A | * | 4/1984 | Dvoracek | 208/48 AA |
| 4,729,769 A | * | 3/1988 | Schlicht et al. | 208/48 AA |
| 4,813,482 A | * | 3/1989 | Walton | 166/267 |
| 4,842,716 A | * | 6/1989 | Kaplan et al. | 208/48 AA |
| 4,973,775 A | * | 11/1990 | Sugier et al. | 585/15 |

FOREIGN PATENT DOCUMENTS

EP          601609 A1 * 6/1994

* cited by examiner

*Primary Examiner*—Robert Dawson

(57) ABSTRACT

The invention relates to the use of (A) esters of phosphoric acid and/or partial salts thereof with alkoxylated aliphatic, cycloaliphatic and/or aromatic alcohols and/or (B) fatty acid oligo-dialkanolamides as inhibitors against the formation of incrustations based on organic solids from liquid and/or gaseous hydrocarbon mixtures which are fluid and prone to form such incrustations. Preferred inhibitors having a surface-active character are capable of wetting, and especially of spreading on, solid work material surfaces also in the presence of the fluid hydrocarbon phase. They are particularly suitable as additives to crude oils and/or oil fractions susceptible of forming incrustations.

21 Claims, No Drawings

USE OF SELECTED INHIBITORS AGAINST THE FORMATION OF SOLID ORGANO-BASED INCRUSTATIONS FROM FLUID HYDROCARBON MIXTURES

BACKGROUND OF THE INVENTION

1. Field of the Invention

The invention relates to a proposal for an improved handling of fluid hydrocarbon mixtures having a tendency forming solid organic deposits, especially based on hydrocarbons, upon storage and/or when processed, which deposits then will remain as undesired incrustations in the interior of pipelines, pumps, filters, containers and the like and require a considerable expenditure for cleaning. Particularly concerned by this problem are the areas of extracting, storing and/or conveying crude oils having high contents of paraffinic hydrocarbons and/or of correspondingly handling oil fractions containing such hydrocarbon compounds. Nevertheless, comparable problems may also arise in extracting and processing natural gas; hereto cf., for example, F. Kerekes et al., "Maßnahmen gegen Paraffin-Ablagerungen in der Erdöl- und Erdgasförderung", Erd öl-Erdgas-Zeitschrift 99 (4/1983), 110–118 and the literature quoted therein.

Functional disorders caused by a deposition of proportions of organic solids—and more particularly paraffins and/or asphaltenes—contained in hydrocarbon mixtures that are fluid under normal conditions are various in nature and, thus, become manifest in a great variety of ways. One important parameter in this respect is the temperature range of the pour point or of the setting point of the liquid hydrocarbon mixture. In the temperature range exceeding this value, the fluidity would be basically ensured, while the hydrocarbon mixture will solidify at temperatures below said value. Crude oils and/or hydrocarbon fractions having comparably high pour and setting points may be improved with respect to the flow property thereof also at reduced temperatures by the addition of so-called Pour Point Depressants (PPD's). The addition of PPD's, due to an interaction with the amounts of solids crystallizing in the liquid phase, reduces the limiting temperature below which the fluidity of the hydrocarbon mixture is lost.

However, independently of the problem area referred to herein, there exists a complex second problem area for the practical handling of such liquid hydrocarbon mixtures, but also of gaseous hydrocarbon mixtures. This is related to the incrustations which in practice give rise to a variety of disorders and have been formed by solid hydrocarbon compounds on the inner walls of, for example, pipelines, pumps, on filters or in storage tanks, which incrustations occur even if the fluidity of the hydrocarbon mixture itself is retained. Thus, for example, the interior of pipelines for the transportation of crude oil must be regularly subjected to cleaning procedures which are expensive in time and costs, because in the regular operation of conveying oil incrustations of solid hydrocarbon compounds are increasingly formed on the inner wall of the pipelines. The working order of pumps and filters is threatened by such formation of incrustations during the continuous operation, if incrustations of this type are uninhibitedly permitted to build up. Particular threats in thus directions are caused also by that the normally flowing liquid hydrocarbon-based material is intermittently exposed to inevitable standstill periods.

2. Discussion of Related Art

Hitherto the efforts made in the art for finding solutions to these problems have had only a restricted practical success. What has been desired is, by adding efficient inhibitors to prevent, or at least to reduce, this undesirable tendency towards incrustation and more particularly the strong adhesion of the, e.g., paraffinic incrustations to the solid surfaces being in contact with the liquid and/or gas phases. Here, the addition of the known PPD's lowering the setting and/or pour point(s) of the kind discussed above does not provide remedy. Really useful inhibitors for the goal according to the invention so far have not been proposed in connection with liquid hydrocarbon mixtures. The literature reference quoted above from Erdöl-Erdgas-Zeitschrift 99 deals with paraffin deposits from natural gas condensates, among others. Here, laboratory experiments were reported for developing paraffin inhibitors based on wetting agents and/or dispersants. Such wetting agents acting through a water phase form a surface film on the walls which largely counteracts a deposition of paraffins and/or infiltrates and mobilizes films already present, respectively. More specifically, for practical use there is proposed a combination of a nonylphenol ethoxylate and a dodecylbenzyl sulfonate.

The teaching according to the invention is based on the recognition that two substance classes preferably having a surfactant character as described in detail hereinbelow are capable of providing remedy to the problems concerned here in a hitherto unknown manner. These auxiliary agents of the invention, hereinbelow designated as the active substances (A) and (B), are obviously distinguished by that they are capable of striking and spreading on the solid work material surfaces—conventionally metal surfaces—and here counteract the attachment and growth of solid hydrocarbon deposits and, hence, the undesirable incrustation, supposedly so due to the chemical nature thereof.

DESCRIPTION OF THE INVENTION

Thus, the invention relates to the use of (A) esters of phosphoric acid and/or partial salts thereof with alkoxylated aliphatic, cycloaliphatic and/or aromatic alcohols and/or (B) fatty acid oligo-dialkanolamides as inhibitors against the formation of solid hydrocarbon incrustations from hydrocarbon mixtures which are fluid and prone to form such incrustations. The term "aromatic alcohols" as used in the context of the component (A) includes phenols and corresponding compounds having the OH group(s) bonding to the aromatic moiety.

It is preferred to employ inhibitors according,to (A) and/or (B) which exhibit surfactant character and, in addition, are capable of-wet,tig solid work material surfaces and especially of spreading on solid work material surfaces also in the presence of the fluid hydrocarbon phase, even if this is comprised by liquid hydrocarbon mixtures. The inhibitors of the invention according to (A) and/or (B) are especially suitable for the protection of metallic work material surfaces which are in contact with the fluid hydrocarbon phase tending to form incrustations.

Re the definition of the inhibitors (A) according to the invention:

The active substances of this class of inhibitors used according to the invention are esters of phosphoric acid with selected alcohols. Included in the invention is the use of the phosphoric acid triesters. In preferred embodiments there are employed partial esters or mixtures of partial esters of phosphoric acid and the selected alcohols still to be described herein-below. In the case that such partial esters are used, it may be expedient to utilize the non-esterified acid groups in the form of salts thereof, and especially in the form of alkali metal salts, ammonium salts, alkanolamine salts and/or amine salts. As the inhibitor component (A) there may be particularly suitable mixtures of mono- and/or diesters of phosphoric acids and/or their respective salts.

Within the scope of this inhibitor component (A) there are employed, as the ester-forming alcohol components, alkoxylated aliphatic, cycloaliphatic and/or aromatic alcohols which preferably contain at least 3, especially at least 4 to 6, carbon atoms in the aliphatic, cycloaliphatic and/or aromatic alcohol moiety. A particularly suitable class of ester-forming alcohols is constituted by alkoxylated phenol- derivatives, among which alkoxylated alkylphenols may be of particular importance as phosphoric acid ester-forming alcohol components. Alkoxylated fatty alcohols constitute a further preferred class of compounds for composing the inhibitors (A).

As the alkoxylated products of said alcohols within the scope of the invention there are especially utilized the ethoxylated and/or propoxylated derivatives of monofunctional alcohols or phenols, respectively. The degree of alkoxylation may be, for example, within the range of from 1 to 20, and especially within the range of from about 3 to 15, and is in detail in a per se known manner also dependent on the size of the respective hydrocarbyl moiety in the monofunctional alcohol. Thus, e.g., ethoxylated nonylphenols having an average of 5 to 10 ethylene oxide (EO) units per 1 mole of nonylphenol have proven to be very suitable as balanced and efficient alkoxylated alcohols for the formation of the inhibitor component (A) within the scope of the invention. One preferred component (A) for the teaching according to the invention comprises mixtures of the sodium salts of mono- and diesters of phosphoric acid with such nonylphenol/5–10 EO adducts. EO adducts of fatty alcohols of the range of $C_{8-20}$, and especially $C_{10-18}$, comprising from 1 to 20 EO units, and preferably about from 3 to 15 EO units, are a further important class for the formation of the inhibitors under (A).

The inhibitors used according to the invention of the active substance class (B) are fatty acid oligo-dialkanolamides. Within this meaning, the term fatty acid includes monocarboxylic acids containing at least 6 to 8 carbon atoms, while acids containing at least 10 carbon atoms and above all monocarboxylic acids of the range containing 12 and more carbon atoms are especially preferred. The carboxylic acid, in consideration of the explanations further provided hereinbelow, may be saturated and/or unsaturated. Olefinically mono- and/or polyunsaturated carboxylic acids, particularly from the range of $C_{12-24}$, are particularly suitable representatives.

In the inhibitor component (B) according to the invention the carboxylic acids are present as oligo-dialkanolamides, i.e. as carboxylic acid amides from the reaction with a limited excess of dialkanolamines. Preferred as the dialkanolamines are compounds having comparably low hydroxyalkyl moieties, especially with corresponding moieties having up to 5, and preferably up to 3, carbon atoms. Diethanolamine may be especially suitable for the preparation of the inhibitor component (B).

Suitable to serve the purpose according to the invention are reaction products of fatty acids prepared by using a slight excess of the dialkanolamine over the amount stoichiometrically required for the formation of the fatty acid amide. Especially suitable are inhibitor components (B), in the preparation of which the fatty acid-based reaction component has been reacted with an at least about 0.5 molar excess of the dialkanolamine. Suitable may be reaction products of fatty acids and dialkanolamines which comprise the dialkanolamine in an about 0.5 to 3.0 molar excess, relative to the amount of carboxylic acid. If the reaction of the reactants forming the inhibitor component (B) is carried out at sufficiently high temperatures—for example at temperatures in excess of 175° C. to 180° C.—then the formation of the carboxylic acid amide proceeds, on the one hand, while, on the other hand, an extension of the chain of the amide-forming reactant is effected due to a removal of water and an ether formation between the free hydroxyl groups of the dialkanolamines, as is shown hereinbelow for an idealized reaction between one mole of a carboxylic acid RCOOH and two moles of diethanolamine:

At reaction temperatures in the range of about 190° C. a fatty acid amide having the idealized formula

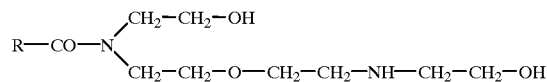

is obtained. Possible is also a linkage with the formation of a tertiary N atom in the chain-extended group.

For the effect provided by the inhibitor component(s) (A) and/or (B) according to the invention it can be important that they have some fluidity. In this respect, more particularly, in the selection of the carboxylic acid amide compounds, olefinically mono- and/or polyunsaturated carboxylic acids may be of importance. The respective fatty acids of natural origin, and among these especially olefinically unsaturated fatty acid mixtures are particularly suitable for the preparation of the inhibitor-components (B). Known as one significant example for this are tall oil fatty acids a by far predominant proportion of which consists of a mixture of olefinically monounsaturated, di-unsaturated and tri-unsaturated $C_{18}$-monocarboxylic acids. Other suitable natural feed materials for unsaturated fatty acids are vegetable ester oils comprising olefinically monounsaturated and, as the case may be, polyunsaturated carboxylic acids, especially those of the range of $C_{16-24}$. For example, palm oil, peanut oil, castor oil soybean oil, fish oil and especially rapeseed oil may be mentioned here.

Each of the inhibitor components (A) and (B) as defined according to the invention may be put into use alone by itself in the hydrocarbon mixture susceptible of forming incrustations. However, it is preferred to use mixtures of (A) and (B), where the broad range of ratios of amounts of A/B of from about 5/95 to 95/5 is contemplated. Preferred mixing ratios are within the range of from about 25/75 to 75/25 and more particularly those within the range of from about 40/60 to 60/40. The ratios of amounts and/or ranges, respectively, are based on the ratio by weight of the components (A) and (B). Particularly equal inhibitor mixtures under the teaching of the invention contain approximately equal amounts by weight of (A) and (B).

A number of technical options exists for rendering the wall areas intended to be protected inert to the undesired build-up of incrustations. One embodiment comprises applying the inhibitors or inhibitor mixtures in a suitable auxiliary liquid onto the wall areas to be protected and allowing them to be adsorbed thereon. For example, solutions of the inhibitors or inhibitor mixtures, respectively, in solvents can be applied onto the wall areas to be protected, for example by spraying, before the respective working device will be contacted with the hydrocarbon mixture susceptible of forming incrustations.

Suitable as auxiliary liquids, more particularly, are appropriate aqueous and/or organic systems. The inhibitors used according to the invention, in the preferred embodiment, possess some dissolving power and/or self-emulsifying power in an aqueous phase, due to their surfactant character, and in this form may be conveyed to the wall areas to be protected or to other solid areas. However, solutions and/or emulsions of the inhibitors in organic or organic-aqueous liquid systems are also suitable for use in such a pretreatment, due to the high affinity to solid surfaces, more particularly those made of metal. If required, the homogeneity of the liquid phase for rendering the wall areas intended to be protected inert to the undesired build-up of incrustations can be ensured by using auxiliary emulsifiers in a per se known manner.

Nevertheless, the formation of the protective layers according to the invention against the undesirable formation of incrustations is not restricted to such pre-treatment of the regions to be protected. It is much easier, as a rule, to add comparably low amounts of the inhibitors to the hydrocarbon mixtures which, in the absence of the additives according to the invention, cause the undesired formation of the incrustations to take place. Thus, it may be appropriate to add the surfactant inhibitors to liquid hydrocarbon mixtures in amounts of about from 5 to 1,000 ppm, preferably in amounts of about from 10 to 500 ppm and especially in amounts of about from 20 to 200 ppm. It has been shown that even in such high application dilutions—which in practical use may range from about 30 to 100 ppm—the surface-active inhibitors are adsorbed on the wall areas made, for example, of metal, and here efficiently attain the object according to the invention. Moreover, it has been shown that an efficient protection can also be achieved, if this addition of the inhibitors according to the invention is effected just batchwise, for example as an additive to a crude oil stream passed through a pipeline. The interior wall areas remain inert to an undesirable paraffin deposition over a considerable period of time, even if in this subsequent period the crude oil stream does not contain any inhibitor components. The embodiments described here may also be combined.

In an important embodiment of the invention, the inhibitor components (A) and (B) as defined are used in combination with conventional setting point depressants, with respect to the nature of which reference may be made to pertinent prior art. Commercial setting point depressants are known to be, for example, branched polymer compounds having some longer residues, for example acrylate polymers comprising moieties of long-chain fatty alcohols—especially those of the range $C_{20-24}$—in an ester bond to the polymer chain. Further examples of known flow improvers or setting point depressants of the kind referred to here are to be assigned to the classes of the polyethylenes and the ethylene-vinyl acetate copolymers add/or ethylene-vinyl propionate copolymers. Even if the detailed mechanism of action of these products has not been fully elucidated, they have in common that first the modifying auxiliary agents will have to be heated together with the crude oil at temperatures much above the setting point. Upon subsequent cooling, interactions occur between the dissolved inhibitors of the PPD type and the precipitating organic solids. Normally, the crystal growth will he hindered, so that small particles are formed which do not permit a formation of networks. As for details, reference is made to the publication as initially quoted in Erdöl-Erdöl-Erdgas-Zeitschrift 99, 113–114.

The inhibition of the incrustation within the scope of the teaching of the invention obviously is governed by different principles. Adsorption onto the wall surfaces to be protected from an incrustation build-up and spreading on said wall surfaces of the inhibitors (A) and/or (B) according to the invention does not require the combination of flow components to be heated, for example of the crude oil stream to be conveyed and inhibitors or inhibitor combination, respectively.

However, it was found that the concomitant use of the inhibitors (A) and (B) according to the invention may also exert an influence on the manifestation, for example, of the paraffinic solid crystals being formed in the oil stream. Crystal formations like those formed below the so-called cloud point may also be affected by the concomitant use of the inhibitors (A) and (B) according to the invention. Investigations have shown that a characteristic phenomenon may be represented by a reduction in size of the crystallites and, thus, the solids particles being in solid communication with each other. This phenomenon may give a positive effect onto the flow behavior of the oil stream containing solid precipitates, even if this would not necessarily involve a decrease in the setting point.

EXAMPLES

Experimental Setup

A reservoir having a capacity of 5 liters for holding the particular oil to be examined is provided with a stirrer, a thermometer for measuring the oil temperature, an oil withdrawal pipe and an oil feed pipe. Said feed and withdrawal pipes are part of an oil circulation system operated by means of a pump circulating the oil with a controllable flow velocity.

In this circulation piping for the circulated oil stream there is provided one pipe piece made of iron filled with a dense packing of Raschig rings. Said iron pipe portion is located in a cooling bath the temperature of which is thermostated during the respective period of the operation. Also the temperature of the oil stock in the reservoir is adjustable and/or maintainable to a pre-determined value by thermostatic control during the circulating operation.

The liquid pressure of the oil stream withdrawn from the reservoir is measured at the point directly before said oil stream enters the Raschig ring-filled iron pipe portion and is displayed by an appropriate pressure gauge.

Conditions of Process Operation

The temperature of the oil contained in the reservoir is adjusted to a predetermined value which is by about 20° C. to 30° C. higher than the setting point of each oil sample being investigated and thermostated at that temperature.

The temperature of the cooling bath in which the Raschig ring-filled iron pipe portion of the circulated stream is immersed is adjusted to a temperature within a range up to about 4° C. higher than the setting point of the employed oil sample and is maintained at that preset value ±1° C.

The pump delivery rate in the circulated oil stream is set to a predetermined value and kept constant at said value for the duration of the experiment. In the tests described hereinbelow, the pump delivery rate of the liquid stream is 15 ml/min.

One test cycle normally takes 8 hours. Due to the formation of incrustations in the Raschig ring-filled and cooled iron pipe portion there is observed an increase in the pressure of the oil stream directly in front of the entrance into the cooled pipe portion, said pressure increase being caused by the degree of incrustations formed and, hence, the reduction in the cross-section of the flow path. Each test cycle is terminated before the end of the 8 hour period, once the pressure increase amounts to 50% of the initial oil pressure in the beginning of the test cycle.

Experimental Results

A paraffin-containing crude oil having a setting point determined according to ASTM D 97 B (maximum setting point) of 18±1° C. is adjusted to the regular temperature of 40° C. in the reservoir. The temperature of the cooling bath for the Raschig ring-filled iron pipe portion is maintained at 22° C.

The pressure measured immediately after starting and adjusting the oil circulating process in the withdrawal pipe directly in front of the entrance into the cooled pipe portion is about 2 bar.

A first test is carried out in the absence of inhibitors according to the invention. After the oil was circulated under the conditions set forth above for a period of 4.5 hours, the pressure at the point of measurement in the oil stream had increased by 50%. Then, the experiment was stopped.

In the subsequent tests, an inhibitor mixture of the components (A) and (B) according to the invention as defined hereinbelow is employed:

Inhibitor Component (A)

A mixture of phosphoric acid mono- and diesters is produced by reacting 2.8 moles of nonylphenol +6.5 EO with 1 mole of $P_2O_5$. The acidic ester mixture is converted into the corresponding salts with the stoichiometric amount of 50% aqueous sodium hydroxide solution. A minor amount of nonylphenol +6.5 EO is added to the substance mixture as an auxiliary emulsifier (about 23% by weight of auxiliary emulsifier, relative to the total mixture).

The inhibitor is present in the form of a high viscosity liquid phase which is emulsifiable/soluble in water and liquid organic solvents.

Inhibitor Component (B)

Employed is a tall oil fatty acid oligo-diethanolamide from 1 mole of tall oil fatty acid (about 2% by weight of residual resin) and 2 moles of diethanolamine. The product obtained at a reaction temperature of 190° C. has an amine value of 123 and an acid value of 4.4. It is a reaction product which is fluid under normal conditions.

In the following experiments, the inhibitors (A) and (B) are employed as an admixture comprising equal amounts by weight of either.

Example 1

The inhibitor mixture according to the invention is, added in an amount of 30 ppm to the crude oil and uniformly distributed therein, before the oil circulation stream is started. Then, circulating oil flow is maintained under the process conditions as reported over a period of 8 hours. After the end of the test period, the pressure increase in the oil stream at the entrance into the Raschig ring-filled pipe portion was about 5%.

Example 2

The procedure of Example 1 is repeated, except that the inhibitor mixture according to the invention is added in an amount of 250 ppm to the crude oil.

Upon termination of the test after 8 hours, any noticeable pressure increase in the circulated oil stream is not determinable.

Example 3

Prior to the begin of the test, the Raschig ring-filled pipe portion of the circulation system is immersed over night in an aqueous 2% by weight emulsion of the inhibitor mixture according to the invention. The aqueous phase is allowed to drain off from the treated iron pipe piece which is then inserted into the designed circulating system. Then the crude oil capable of undergoing paraffin precipitation is charged into the reservoir without adding any additional inhibitors according to (A) and/or (B), and the oil circulation process is initiated under the described conditions. After a process operation over 8 hours, any substantial pressure increase in the circulated oil stream in front of the entrance into the cooled pipe portion is not determinable.

What is claimed is:

1. The process of inhibiting the formation of solid hydrocarbon incrustations from hydrocarbon mixtures which are fluid and prone to form such incrustations, comprising contacting said hydrocarbon mixtures with an inhibitor mixture comprising
   (a) esters of phosphoric acid or salts thereof and alkoxylated aliphatic, cycloaliphatic or aromatic alcohols, and
   (b) fatty acid oligo-dialkanolamides.

2. A process as in claim 1 wherein said inhibitor mixture is surface-active and capable of wetting or spreading on solid work material surfaces in the presence of said hydrocarbon mixtures.

3. A process as in claim 1 wherein said inhibitor mixture is applied in an aqueous or organic liquid to surface areas to be protected from incrustation.

4. A process as in claim 1 wherein said hydrocarbon mixtures are contacted with from about 5 to about 1,000 ppm of said inhibitor mixture.

5. A process as in claim 1 wherein said inhibitor mixture is present in a weight ratio of (a) to (b) of from about 5:95 to 95:5.

6. A process as in claim 1 wherein said esters of phosphoric acid or salts thereof comprise alkoxylated phenol compounds.

7. A process as in claim 6 wherein said esters of phosphoric acid or salts thereof comprise a mixture of the salts of mono- and diesters of phosphoric acid with nonyl phenol containing 5 to 10 moles of ethylene oxide.

8. A process as in claim 1 wherein said fatty acid oligo-dialkanolamides comprise the reaction products of saturated or unsaturated $C_{12}$–$C_{24}$ monocarboxylic acids and a molar excess of dialkanolamines.

9. A process as in claim 1 wherein said fatty acid oligo-dialkanolamides comprise the reaction products of unsaturated $C_{16}$–$C_{20}$ carboxylic acids and a 0.5 to 3.0 molar excess of diethanolamine.

10. A process as in claim 1 wherein said fatty acid oligo-dialkanolamides comprise the reaction products of tall oil fatty acids and diethanolamine in a molar ratio of from 1:1.5 to 3 wherein water is removed, and said reaction products have a large degree of oligomerization of said diethanolamine.

11. A process as in claim 1 wherein said inhibitor mixture is employed for the protection of pipelines, pumps, filters, tanks and metal surfaces against the formation of incrustations thereon.

12. The process of inhibiting the formation of solid hydrocarbon incrustations from hydrocarbon mixtures which are fluid and prone to form such incrustations, comprising contacting said hydrocarbon mixtures with 10 to 500 ppm of an inhibitor mixture comprising
    (a) esters of phosphoric acid or salts thereof and alkoxylated aliphatic, cycloaliphatic or aromatic alcohols, and
    (b) fatty acid oligo-dialkanolamides.

13. A process as in claim 12 wherein said inhibitor mixture is surface-active and capable of wetting or spreading on solid work material surfaces in the presence of said hydrocarbon mixtures.

14. A process as in claim 12 wherein said inhibitor mixture is applied in an aqueous or organic liquid to surface areas to be protected from incrustation.

15. A process as in claim 12 wherein said inhibitor mixture is present in a weight ratio of (a) to (b) of from about 5:95 to 95:5.

16. A process as in claim 12 wherein said esters of phosphoric acid or salts thereof comprise alkoxylated phenol compounds.

17. A process as in claim 16 wherein said esters of phosphoric acid or salts thereof comprise a mixture of the salts of mono- and diesters of phosphoric acid with nonyl phenol containing 5 to 10 moles of ethylene oxide.

18. A process as in claim 12 wherein said fatty acid oligo-dialkanolamides comprise the reaction products of saturated or unsaturated $C_{12}$–$C_{24}$ monocarboxylic acids and a molar excess of dialkanolamines.

19. A process as in claim 12 wherein said fatty acid oligo-dialkanolamides comprise the reaction products of unsaturated $C_{16}$–$C_{20}$ carboxylic acids and a 0.5 to 3.0 molar excess of diethanolamine.

20. A process as in claim 12 wherein said fatty acid oligo-dialkanolamides comprise the reaction products of tall oil fatty acids and diethanolamine in a molar ratio of from 1:1.5 to 3 wherein water is removed, and said reaction products have a large degree of oligomerization of said diethanolamine.

21. A process as in claim 12 wherein said inhibitor mixture contains a setting point depressant.

* * * * *